(12) United States Patent
Jaitham et al.

(10) Patent No.: US 8,254,008 B2
(45) Date of Patent: Aug. 28, 2012

(54) BLADE DRIVE DEVICE AND OPTICAL DEVICE

(75) Inventors: Worachai Jaitham, Pathumthani (TH); Prapas Charoensilputthakun, Pathumthani (TH)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/045,881

(22) Filed: Mar. 11, 2011

(65) Prior Publication Data

US 2011/0164298 A1    Jul. 7, 2011

Related U.S. Application Data

(63) Continuation of application No. PCT/JP2009/062625, filed on Jul. 10, 2009.

(30) Foreign Application Priority Data

Oct. 14, 2008    (JP) .................................. 2008-265792

(51) Int. Cl.
*G02B 26/02* (2006.01)
*G03B 9/38* (2006.01)

(52) U.S. Cl. ........ 359/233; 359/234; 359/236; 359/738; 359/740; 396/220; 396/450; 396/487

(58) Field of Classification Search .................. 396/220, 396/357, 449, 450, 452, 458–461, 483–486, 396/488, 493; 359/233, 234, 236, 601, 738–740, 359/888, 889, 894
See application file for complete search history.

(56) References Cited

U.S. PATENT DOCUMENTS

| | | | | |
|---|---|---|---|---|
| 3,580,148 A | * | 5/1971 | Harvey | 396/213 |
| 4,687,926 A | * | 8/1987 | Plummer | 250/226 |
| 4,760,420 A | * | 7/1988 | Lam | 396/242 |
| 5,432,576 A | | 7/1995 | SanGregory | |
| 5,479,298 A | * | 12/1995 | Yanagi et al. | 359/888 |
| 6,866,431 B2 | * | 3/2005 | Namazue et al. | 396/450 |
| 7,436,449 B2 | * | 10/2008 | Mihara | 348/362 |
| 7,798,730 B2 | * | 9/2010 | Westerweck | 396/493 |
| 7,961,246 B2 | * | 6/2011 | Watanabe | 348/362 |
| 2009/0097136 A1 | * | 4/2009 | Otsu | 359/739 |

FOREIGN PATENT DOCUMENTS

JP    7-234437    9/1995
(Continued)

OTHER PUBLICATIONS

International Search Report for International Application No. PCT/JP2009/062625 dated Oct. 1, 2009.

(Continued)

*Primary Examiner* — Frank Font
(74) *Attorney, Agent, or Firm* — Kratz, Quintos & Hanson, LLP

(57) ABSTRACT

A blade drive device includes: a board including an optical path opening; first and second blades cooperatively defining an amount of light passing through the optical path opening to a given amount of light. The first blade includes a first opening. The second blade includes: a first cutout portion defining the amount of light in cooperation with the first opening; and a second cutout portion defining the amount of light in cooperation with the first opening. The second cutout portion overlaps the first blade when the first cutout portion and the first opening cooperatively define the amount of light.

13 Claims, 10 Drawing Sheets

FOREIGN PATENT DOCUMENTS

| JP | 10-90748 | 4/1998 |
| JP | 2002-55375 A1 | 2/2002 |
| JP | 2002-296637 A1 | 10/2002 |
| JP | 2006-113256 | 4/2006 |
| JP | 2007-233054 A1 | 9/2007 |

OTHER PUBLICATIONS

Notification of Submission of Opinion received in counterpart application No. 10-2011-7005422 from the Korean Intellectual Property Office date Apr. 17, 2012 with English translation (8 pages).

* cited by examiner

BLADE DRIVE DEVICE AND OPTICAL DEVICE

CROSS-REFERENCE TO RELATED APPLICATION

This application is a continuation of and claims priority to International Patent Application No. PCT/JP2009/062625 filed on Jul. 10, 2009, which claims priority to Japanese Patent Application No. 2008-265792 filed on Oct. 14, 2008, subject matter of these patent documents is incorporated by reference herein in its entirety.

BACKGROUND (i) Technical Field

The present invention relates to blade drive devices and optical devices.

(ii) Related Art

Conventionally, it is known a device for adjusting the amount of light passing through an optical pass opening formed in a board. Such a device is generally employed in an optical device (see Japanese Unexamined Patent Application Publication No. 2002-296637).

There is such a device where two blades are located to sandwich the optical pass opening, in order to reduce the amount of light. When two blades are located to sandwich the optical pass opening, the area where the plural blades overlap each other, is small. The area where the plural blades overlap each other is small, so that a space of the blades occupied in the whole device is large. Accordingly, the whole device is increased in size.

SUMMARY

It is therefore an object of the present invention to provide a blade drive device and an optical device that are downsized.

According to an aspect of the present invention, there is provided a blade drive device including: a board including an optical path opening; first and second blades cooperatively defining an amount of light passing through the optical path opening to a given amount of light; wherein: the first blade includes a first opening; the second blade includes: a first cutout portion defining the amount of light in cooperation with the first opening; and a second cutout portion defining the amount of light in cooperation with the first opening; and the second cutout portion overlaps the first blade when the first cutout portion and the first opening cooperatively define the amount of light.

DETAILED DESCRIPTION

Figure 1:
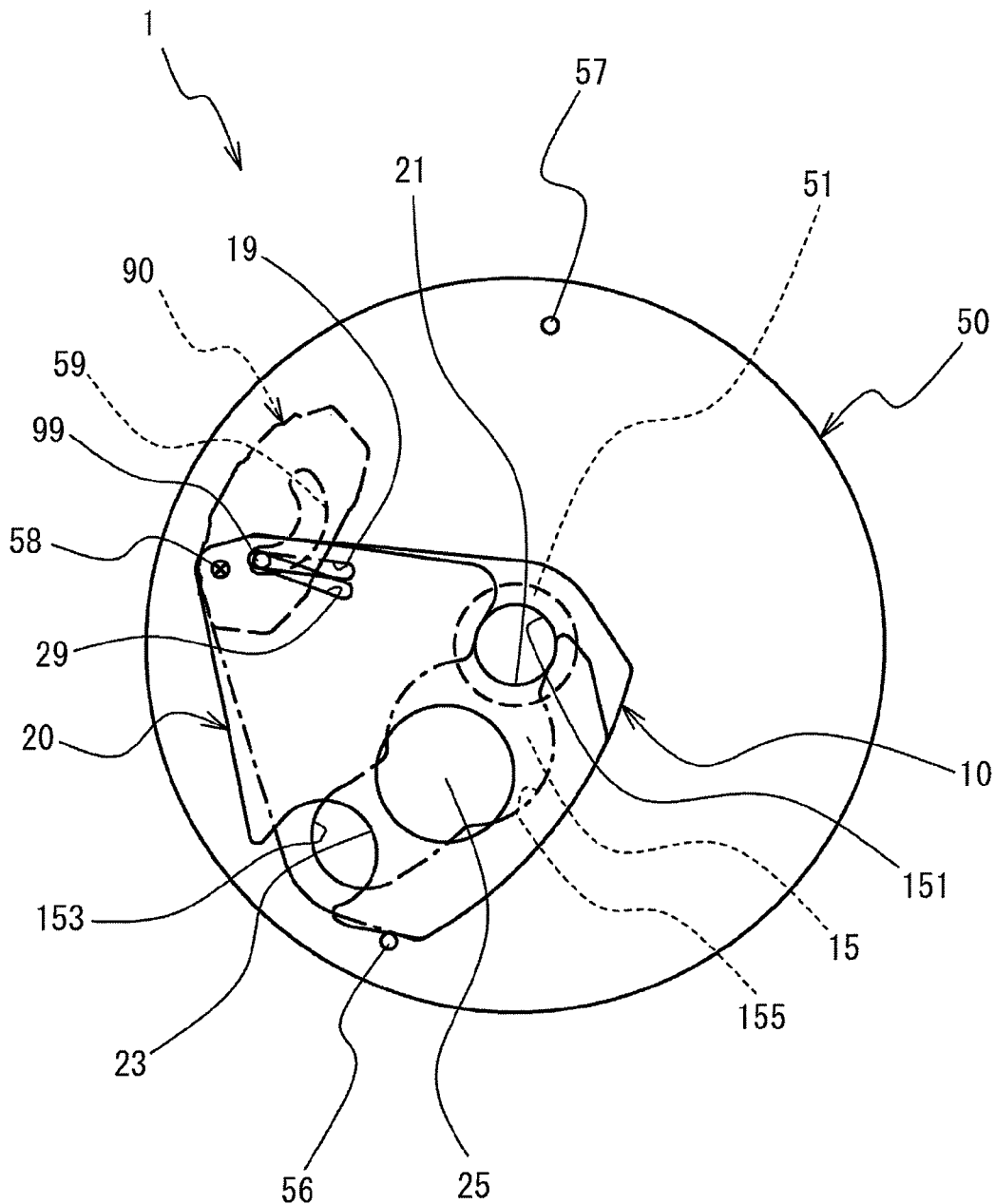
FIG. 1 is a front view of a blade drive device according to a present embodiment.

FIG. 1 is a front view of a blade drive device according to the present embodiment employed in an optical device. A blade drive device 1 functions as an aperture device for adjusting the amount of passing light entering an image pickup element (not illustrated) mounted in an optical device. The blade drive device 1 includes blades 10 and 20, a board 50, and a step motor 90. The blade 10 serves as a first blade, and the blade 20 serves as a second blade.

The board 50 is provided at its center portion with an optical path opening 51, through which light passes from the object side. The blades 10 and 20 cooperatively adjust the amount of light passing through the optical path opening 51. Specifically, the blades 10 and 20 define a fully opened state in which the amount of passing light is maximum, a small aperture state in which the amount of passing light is minimum, and a middle aperture state in which the amount of light is smaller than the maximum and larger than the minimum.

The blades 10 and 20 are swingably supported by a supporting spindle 58 of the board 50. The blades 10 and 20 are arranged at a front surface side of the board 50. The step motor 90 is arranged at a rear surface side of the board 50. The step motor 90 serves as a drive source of the blades 10 and 20. The step motor 90 includes a rotor not illustrated, and the rotation of the rotor moves a drive pin 99. Further, the rotor is capable of stopping at one end of the rotational range and the other end thereof, and a partway position between the both ends. The board 50 is provided with an escape slot 59 having an arc shape along the trajectory of the drive pin 99. The drive pin 99 moves within the escape slot 59. The blades 10 and 20 are respectively provided with cam slots 19 and 29. The drive pin 99 engages the cam slots 19 and 29. The movement of the drive pin 99 moves the drive pin 99 within the cam slots 19 and 29. In response to this, the blades 10 and 20 swing about the supporting spindle 58. The blade 10 is sandwiched between the blade 20 and the board 50.

Figure 2A:
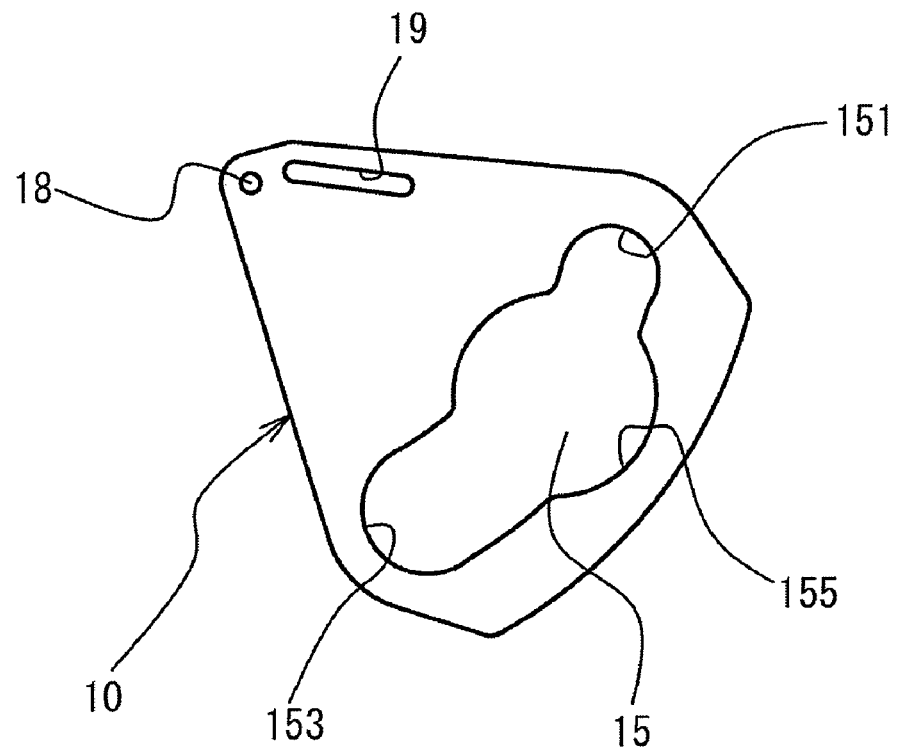
FIGS. 2A and 2B are explanatory views of blades.
Figure 2B:
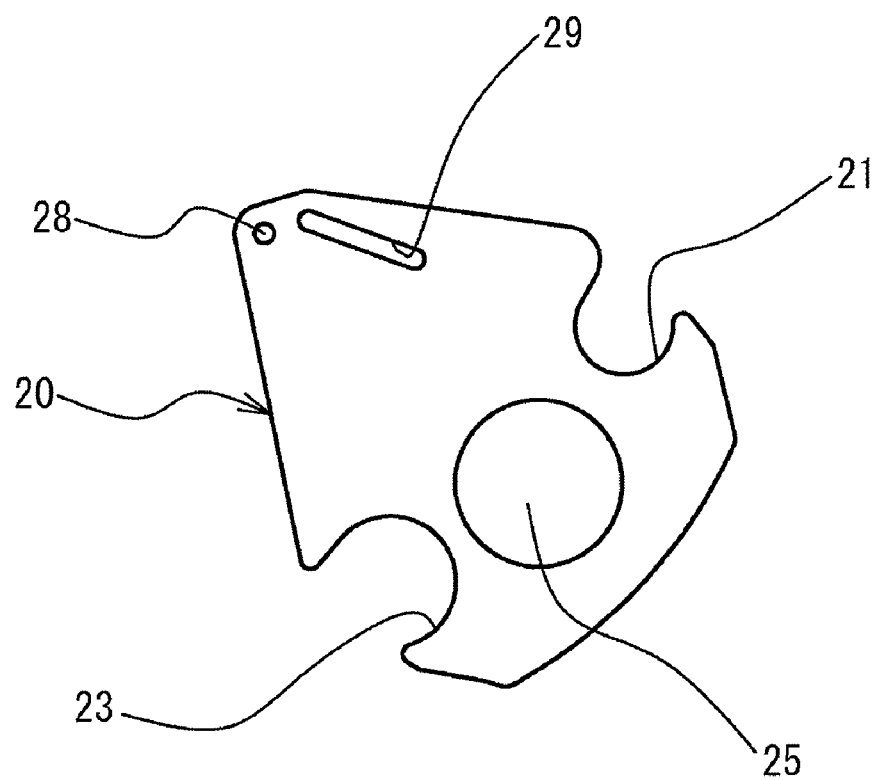

Next, the blades 10 and 20 will be described in detail. FIG. 2A is an explanatory view of the blade 10. FIG. 2B is an explanatory view of the blade 20. The blade 10 has an opening 15. The opening 15 extends along a virtual arc line about a hole 18, which is slidable with the supporting spindle 58. Moreover, the opening 15 serves as a first opening. In FIG. 2A, a first edge portion 151 is formed at an upper side of the opening 15, a second edge portion 153 is formed at a lower side of the opening 15, and a third edge portion 155 is formed at a middle portion. The diameter of the first edge portion 151 is the smallest, and that of the third edge portion 155 is the largest. The opening 15 has a shape such that three circular shaped openings each having a different diameter are continuously arranged to each other.

The blade 20 includes cutout portions 21 and 23, and an opening 25. The cutout portion 21 corresponds to a first cutout portion, the cutout portion 23 corresponds to a second cutout portion, and the opening 25 corresponds to a second opening. The cutout portions 21 and 23 are respectively provided at two opposite sides of the blade 20. The opening 25 is formed to be sandwiched by the cutout portions 21 and 23. The cutout portions 21 and 23, and the opening 25 are provided on a virtual arc line about a hole 28. Each of the cutout portions 21 and 23 is shaped to be an arc. An arc diameter of the cutout portion 21 is smaller than that of the cutout portion 23. The arc diameter of the cutout portion 21 is substantially similar to that of the first edge portion 151. The arc diameter of the cutout portion 23 is substantially similar to that of the second edge portion 153. The diameter of the opening 25 is larger than each of the arc diameters of the cutout portions 21 and 23. Further, the diameter of the opening 25 is smaller than the arc diameter of the third edge portion 155.

First, the small aperture state will be described.

As illustrated in FIG. 1, the cutout portion 21 and the first edge portion 151 cooperatively define an opening with a diameter smaller than that of the optical path opening 51. This causes the amount of light passing through the optical path opening 51 to be minimum. In this small aperture state, the cutout portions 21 and 23, and the opening 25 overlap the blade 10. Additionally, the board 50 is provided with a stopper 56 which defines the positions of the blades 10 and 20 in the small aperture state. Further, in the small aperture state, a rotor of the step motor 90 stops at one end of its rotational range.

Next, the fully opened state will be described.

Figure 3:
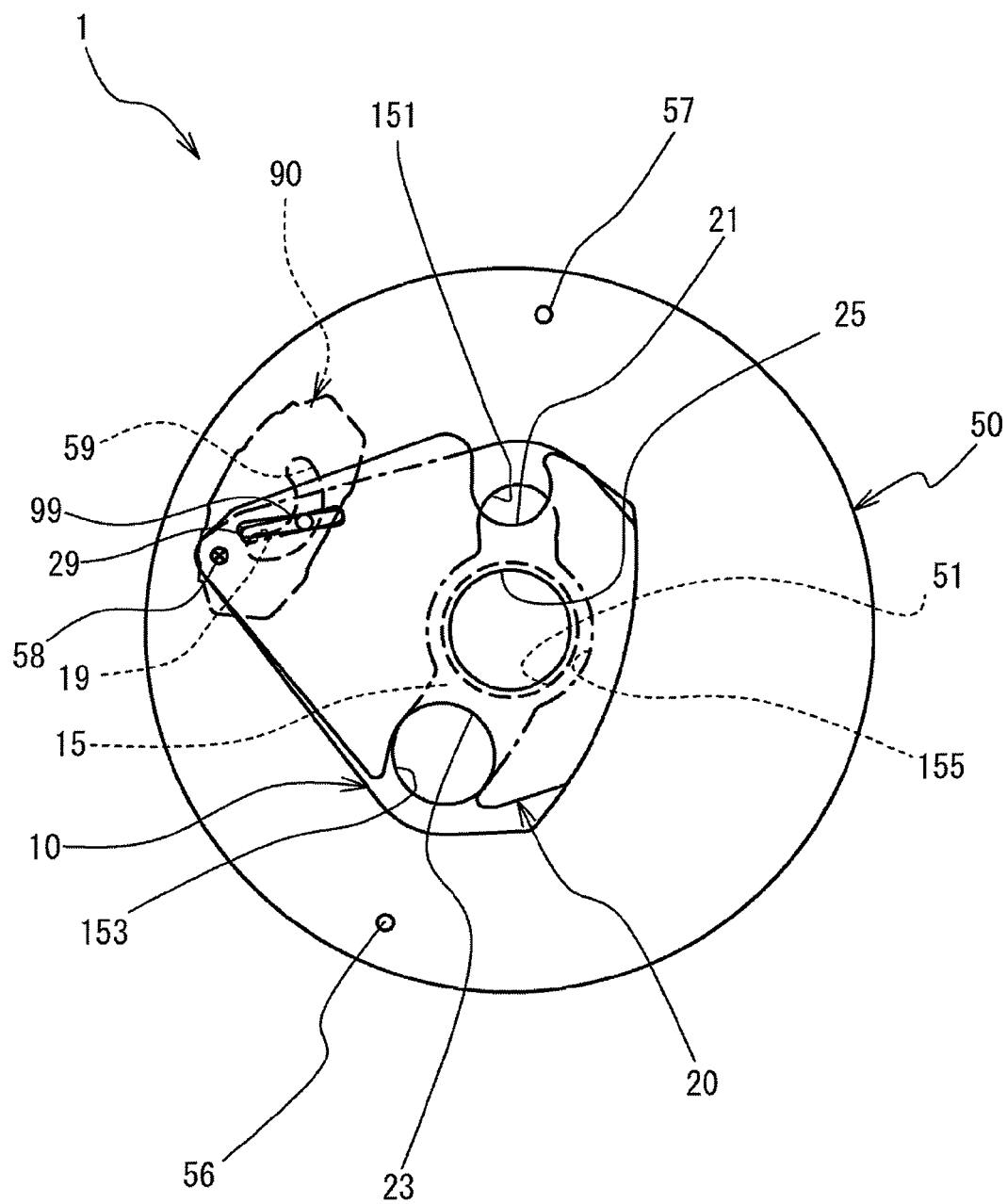
FIG. 3 is a front view of the blade drive device in a fully opened state.

When the drive pin 99 moves to the substantial center of its movable range from the small aperture state, the blades 10 and 20 swing counterclockwise to define the fully opened state. FIG. 3 is a front view of the blade drive device 1 in the fully opened state. Referring to FIG. 3, the opening 25 and the third edge portion 155 cooperatively define the fully opened state. Here, the diameter of the opening 15 is larger than that of the optical path opening 51, and the arc diameter of the third edge portion 155 is larger than the diameter of the opening 15. Further, the diameter of the opening 25 is smaller than the arc diameter of the third edge portion 155. Thus, the amount of passing light of the opening 25 is made maximum. In the fully opened state, the cutout portions 21 and 23, and the opening 25 overlap the blade 10. Additionally, when the fully opened state is shifted from the small aperture state, the movable distance of the blade 20 is larger than that of the blade 10. That is, both of the blades 10 and 20 swing counterclockwise, and the movable distance of the blade 20 is slightly larger than that of the blade 10. Further, in the fully opened state, the rotor of the step motor 90 stops at a partway within its rotational range.

Next, the middle aperture state will be described.

Figure 4:
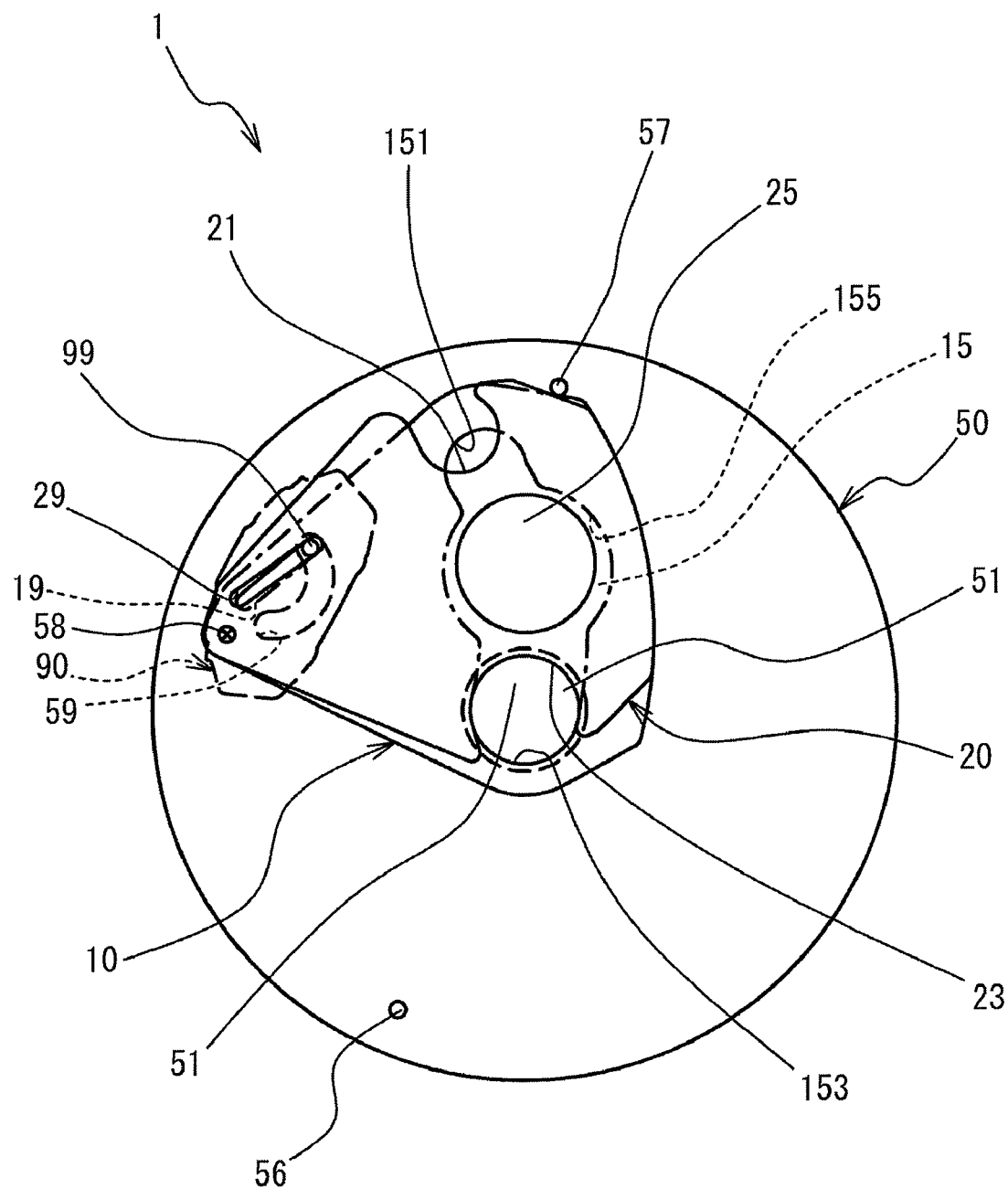
FIG. 4 is a front view of the blade drive device in a middle aperture state.

When the drive pin 99 further rotates counterclockwise from the fully opened state, the blades 10 and 20 further swing counterclockwise to define the middle aperture state. FIG. 4 is a front view of the blade drive device 1 in the middle aperture state. Referring to FIG. 4, the cutout portion 23 and the second edge portion 153 cooperatively define the middle aperture state. In the middle aperture state, the cutout portions 21 and 23, and the opening 25 overlap the blade 10. Also, when the middle aperture state is shifted from the fully opened state, the movable distance of the blade 20 is slightly larger than that of the blade 10. That is, for an identical movable distance of the drive pin 99, the movable distance of the blade 20 is larger than that of the blade 10. The cam slots 19 and 29 are formed such that the movable distances differ from each other, as mentioned above. In addition, the board 50 is provided with a stopper 57 defining the stop positions of the blades 10 and 20 in the middle aperture state. Further, in the middle aperture state, the rotor of the step motor 90 stops at the other end of its rotational range.

As illustrated in FIGS. 1, 3, and 4, the blades 10 and 20 substantially overlap each other in any state. Specifically, the cutout portions 21 and 23, and opening 25 constantly overlap the blade 10, in any one of the small aperture state, the fully opened state, and middle aperture state.

In this way, the blades 10 and 20 constantly overlap each other when the amount of passing light is defined. In other words, the overlapped area between the blades 10 and 20 is large, and most parts of the blades 10 and 20 constantly overlap each other. Accordingly, the space of the blades 10 and 20 occupied in the entire blade drive device 1 can be reduced as much as possible. This makes it possible to reduce the size of the blade drive device 1.

Further, the blades 10 and 20 cooperatively define three states, as mentioned above. In this manner, in order to define three states by use of two blades, a single blade should be provided with plural openings or cutouts, thereby trending to increase the size of the single blade. However, according to the blade drive device 1 according to the present embodiment, the blades 10 and 20 substantially overlap each other in three states, thereby reducing the space of the blades 10 and 20 occupied in the entire blade drive device 1. Therefore, the blade drive device 1 is reduced in size, and has many patterns for defining the amount of passing light.

Figure 5:
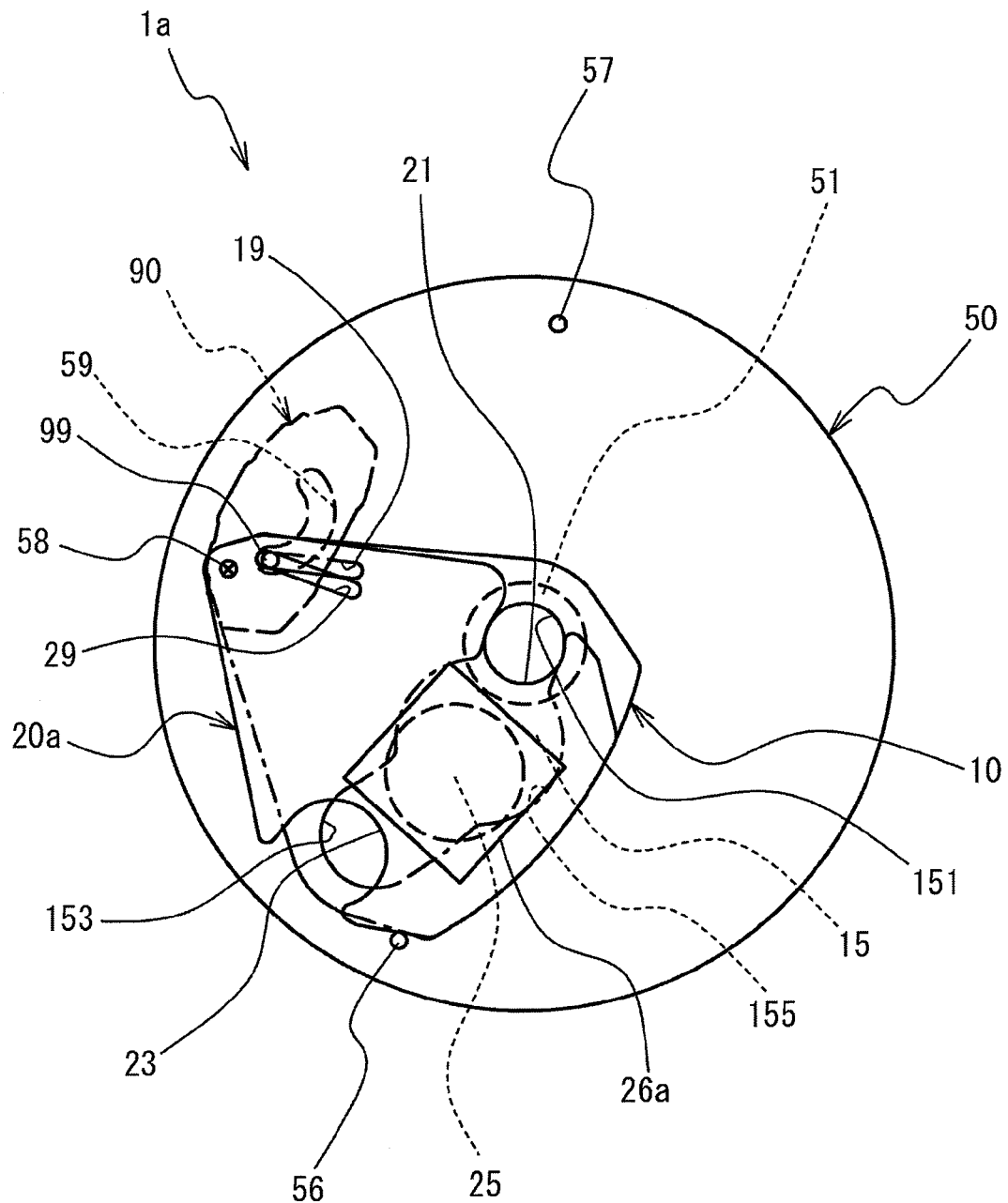
FIG. 5 is a front view of a blade drive device according to a first variation in a small aperture state.
Figure 6:
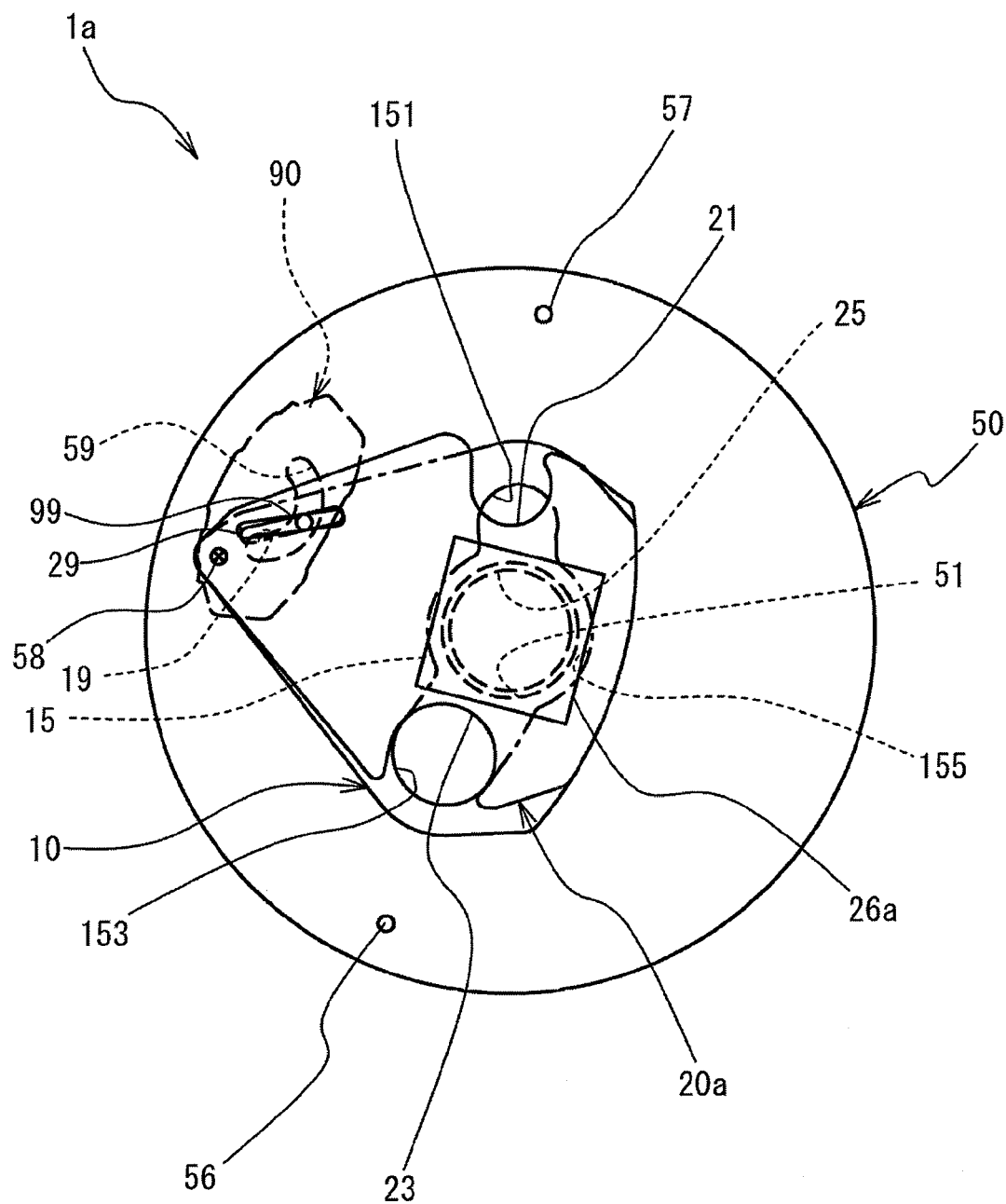
FIG. 6 is a front view of the blade drive device according to the first variation in the fully opened state.
Figure 7:
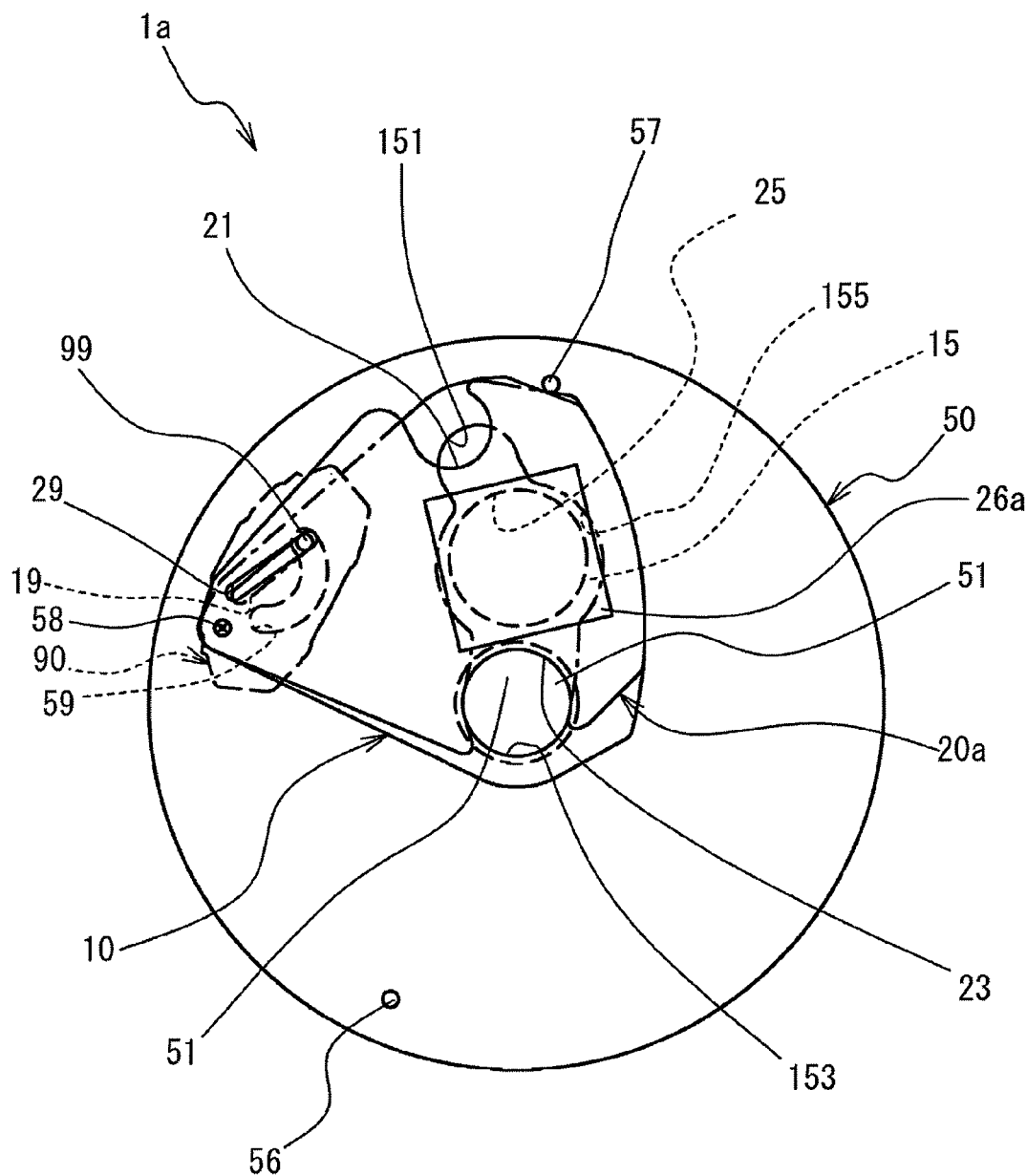
FIG. 7 is a front view of the blade drive device according to the first variation in the middle aperture state.

Next, a variation of a blade drive device. FIGS. 5 to 7 are front views of a blade drive device 1a, and respectively illustrate the small aperture state, the fully opened state, and the middle aperture state.

As illustrated in FIGS. 5 to 7, an ND filter 26a is attached on a blade 20a to cover the opening 25. Referring to FIG. 6, in the fully opened state, the light through the ND filter 26a passes through the optical path opening 51. The blade 20a is made large, thereby ensuring a large adhesive area between the ND filter 26a and the blade 20a. This prevents the ND filter 26a from being separated therefrom. Further, even in a case where the ND filter 26a is attached to the cutout portion 21 or 23 of the blade 20a, it is possible to ensure the large adhesive area between the ND filter 26a and the blade 20a and prevent the ND filter 26a from separated therefrom.

Figure 8:
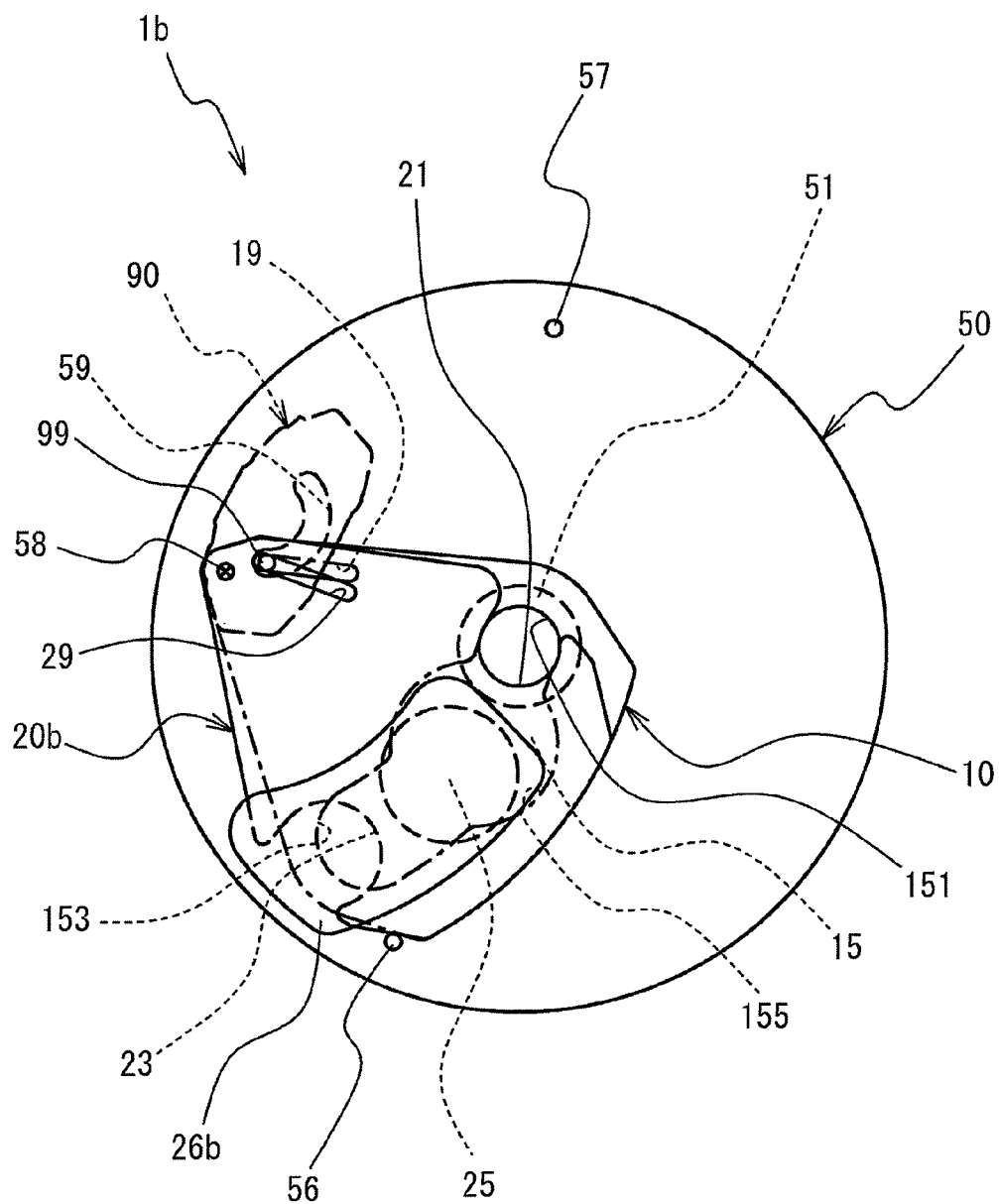
FIG. 8 is a front view of a blade drive device according to a second variation in the small aperture state.
Figure 9:
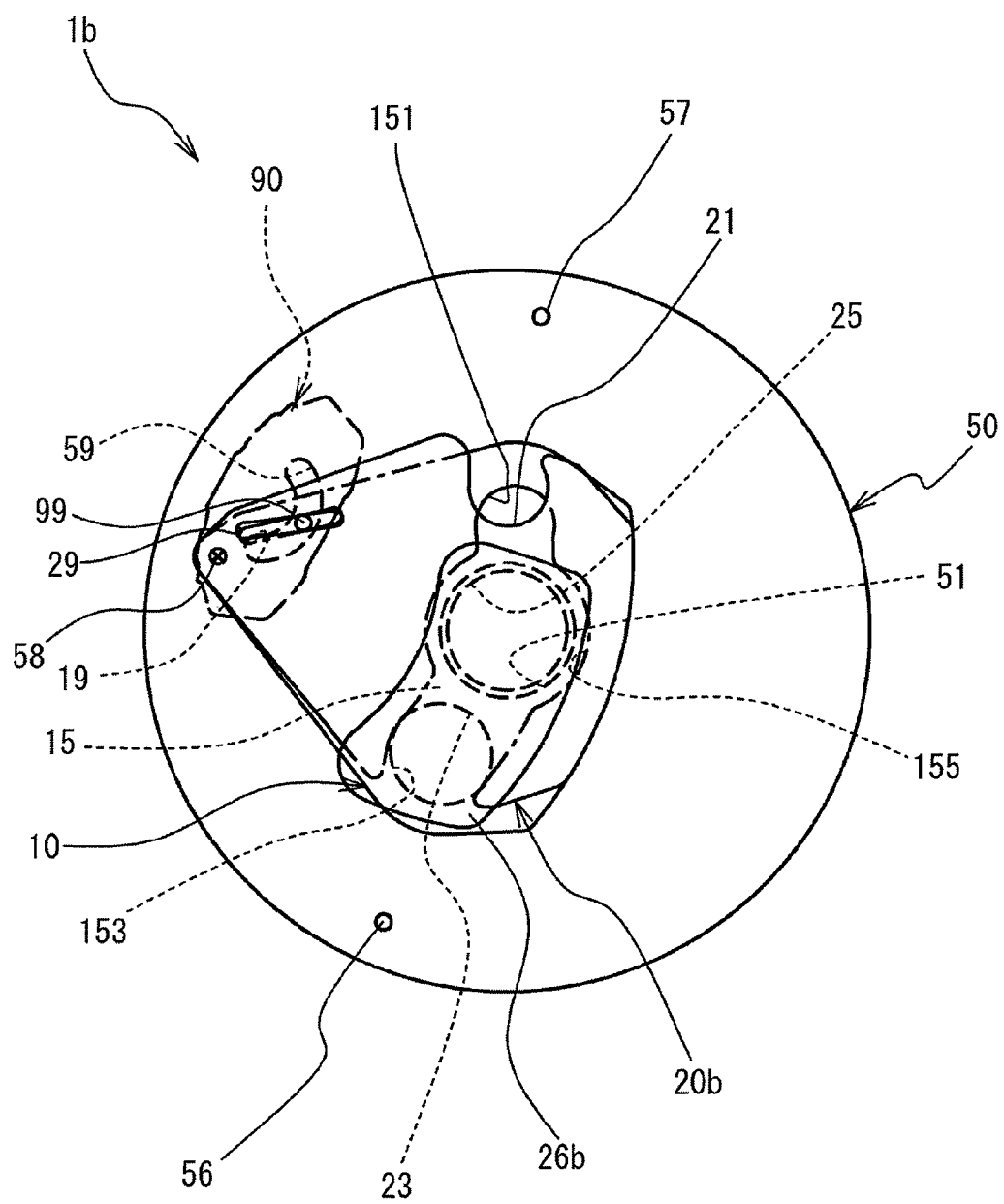
FIG. 9 is a front view of the blade drive device according to the second variation in the fully opened state.
Figure 10:
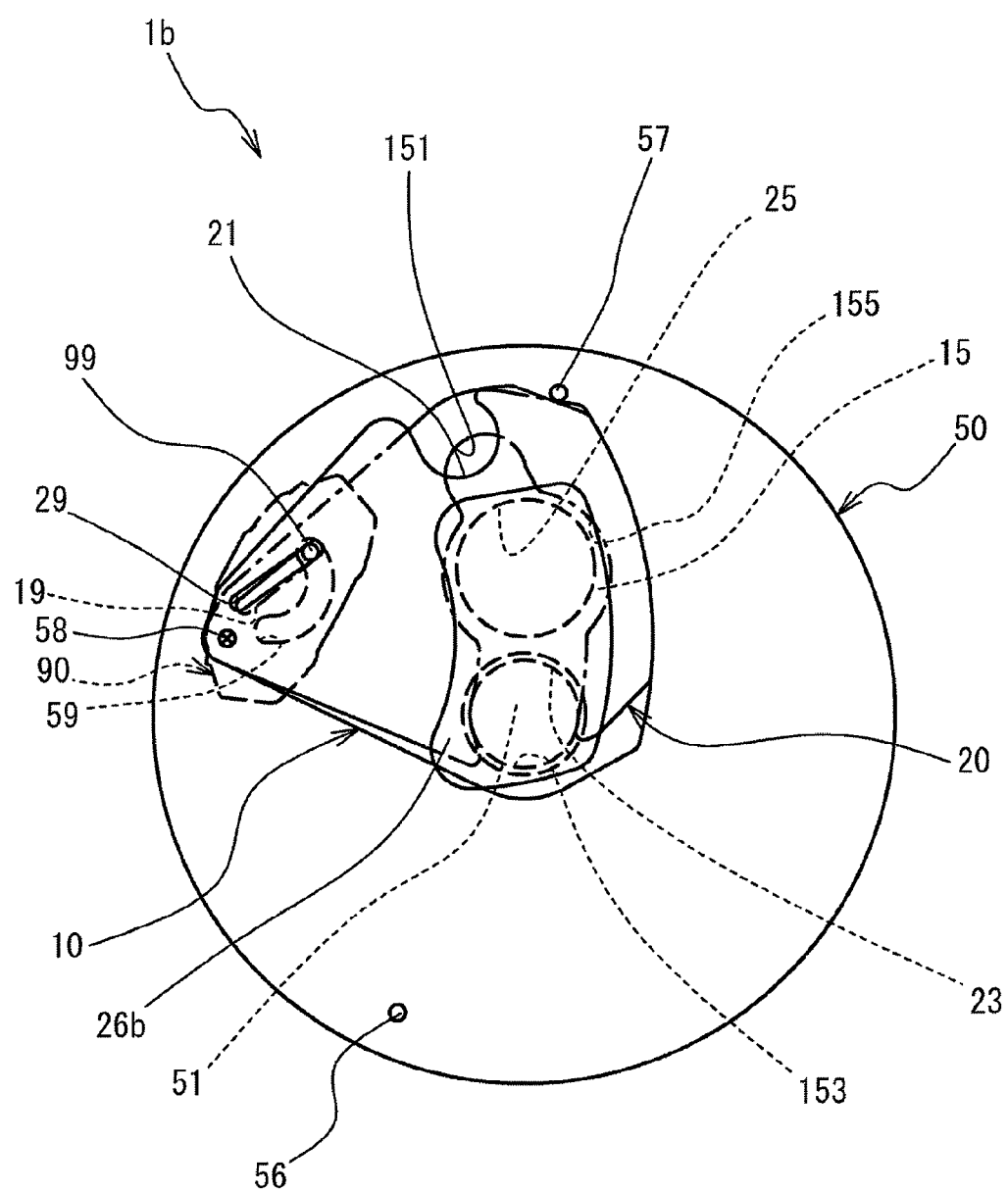
FIG. 10 is a front view of the blade drive device according to the first variation in the middle aperture state.

Next, a blade drive device lb according to a second variation will be described. FIGS. 8 to 10 are front views of the blade drive device lb according to the second variation, and respectively illustrates the small aperture state, the fully opened state, and the middle aperture state.

As illustrated in FIGS. 8 to 10, a single ND filter 26b is attached on a blade 20b to cover the cutout portion 23 and the opening 25. Therefore, in the fully opened state and the middle aperture state, the light passing through the ND filter 26b passes through the optical path opening 51, as illustrated in FIGS. 9 and 10.

As compared to a case where an ND filter covering the opening 25 and a ND filter covering the cutout portion 23 are attached separately, the work is simplified because the single ND filter 26b has only to be attached. Further, it is possible to ensure the adhesive area between the blade 20b and the ND filter 26b and prevent the ND filter 26b from being separated therefrom.

While the exemplary embodiments of the present invention have been illustrated in detail, the present invention is not limited to the above-mentioned embodiments, and other embodiments, variations and modifications may be made without departing from the scope of the present invention.

In the present invention, the blade 20 may not be provided with the opening 25. That is, a blade drive device and an optical device may form the small aperture state, the fully closed state, and the middle aperture state.

Further, in the second variation according to the present invention, a single ND filter may be provided for covering the cutout portion 21 and the opening 25.

Finally, several aspects of the present invention are summarized as follows.

According to an aspect of the present invention, there is provided a blade drive device including: a board including an optical path opening; first and second blades cooperatively defining an amount of light passing through the optical path opening to a given amount of light; wherein: the first blade includes a first opening; the second blade includes: a first cutout portion defining the amount of light in cooperation with the first opening; and a second cutout portion defining the amount of light in cooperation with the first opening; and the second cutout portion overlaps the first blade when the first cutout portion and the first opening cooperatively define the amount of light.

This makes it possible to enlarge the overlapped area between the first and second blades when the amount of light is defined. Thus, it is possible to reduce the space of the first and second blades occupied in the entire device when the amount of passing light is defined.

Further, an optical device having the blade drive device mentioned above can be reduced in size.

What is claimed is:

1. A blade drive device comprising:
a board including an optical path opening;
first and second blades cooperatively defining an amount of light passing through the optical path opening to a given amount of light;
wherein:
the first blade includes a first opening;
the second blade includes:
a first cutout portion defining the amount of light in cooperation with the first opening; and
a second cutout portion defining the amount of light in cooperation with the first opening, the first and second cutout portions respectively provided at opposite sides of the second blade; and
the second cutout portion overlaps the first blade when the first cutout portion and the first opening cooperatively define the amount of light.

2. The blade drive device of claim 1, wherein the first cutout portion overlaps the first blade when the second cutout portion and the first opening cooperatively define the amount of light.

3. The blade drive device of claim 1, wherein the second blade includes a second opening defining the amount of light in cooperation with the first opening.

4. A blade drive device comprising:
a board including an optical path opening;
first and second blades cooperatively defining an amount of light passing through the optical path opening to a given amount of light;
wherein:
the first blade includes a first opening;
the second blade includes:
a first cutout portion defining the amount of light in cooperation with the first opening; and
a second cutout portion defining the amount of light in cooperation with the first opening; and
the second cutout portion overlaps the first blade when the first cutout portion and the first opening cooperatively define the amount of light;
wherein the second blade includes a second opening defining the amount of light in cooperation with the first opening; and
wherein the first and second cutout portions overlap the first blade when the first and second openings cooperatively define the amount of light.

5. A blade drive device comprising:
a board including an optical path opening;
first and second blades cooperatively defining an amount of light passing through the optical path opening to a given amount of light;
wherein:
the first blade includes a first opening;
the second blade includes:
a first cutout portion defining the amount of light in cooperation with the first opening; and
a second cutout portion defining the amount of light in cooperation with the first opening; and
the second cutout portion overlaps the first blade when the first cutout portion and the first opening cooperatively define the amount of light;
wherein the second blade includes a second opening defining the amount of light in cooperation with the first opening; and
wherein the second opening is located between the first and second cutout portions.

6. The blade drive device of claim 1, wherein the first and second blades define the optical pass opening to a fully opened state and a small aperture state.

7. The blade drive device of claim 1, wherein the second blade includes an ND filter.

8. The blade drive device of claim 3, wherein an ND filter covers the second opening.

9. The blade drive device of claim 8, wherein the ND filter is a single member and covers the second opening and at least one of the first and second cutout portions.

10. The blade drive device of claim 1, wherein the first and second blades move in a similar direction.

11. The blade drive device of claim 1, wherein the first and second blades swing about a given position.

12. A blade drive device comprising:
a board including an optical path opening;
first and second blades cooperatively defining an amount of light passing through the optical path opening to a given amount of light;
wherein:
the first blade includes a first opening;
the second blade includes:
a first cutout portion defining the amount of light in cooperation with the first opening; and
a second cutout portion defining the amount of light in cooperation with the first opening; and
the second cutout portion overlaps the first blade when the first cutout portion and the first opening cooperatively define the amount of light;
wherein the second blade includes a second opening defining the amount of light in cooperation with the first opening; and
wherein the first opening includes:
a first edge portion defining the amount of light in cooperation with the first cutout portion;
a second edge portion defining the amount of light in cooperation with the second cutout portion; and a third edge portion defining the amount of light in cooperation with the second opening.

13. An optical device comprising a blade drive device, the blade drive device including:

a board including an optical path opening;

first and second blades cooperatively defining an amount of light passing through the optical path opening to a given amount of light;

wherein:

the first blade includes a first opening;

the second blade includes:

a first cutout portion defining the amount of light in cooperation with the first opening; and a second cutout portion defining the amount of light in cooperation with the first opening, the first and second portions respectively at opposite sides of the second blade; and the second cutout portion overlaps the first blade when the first cutout portion and the first opening cooperatively define the amount of light.

* * * * *